Patented Dec. 13, 1938

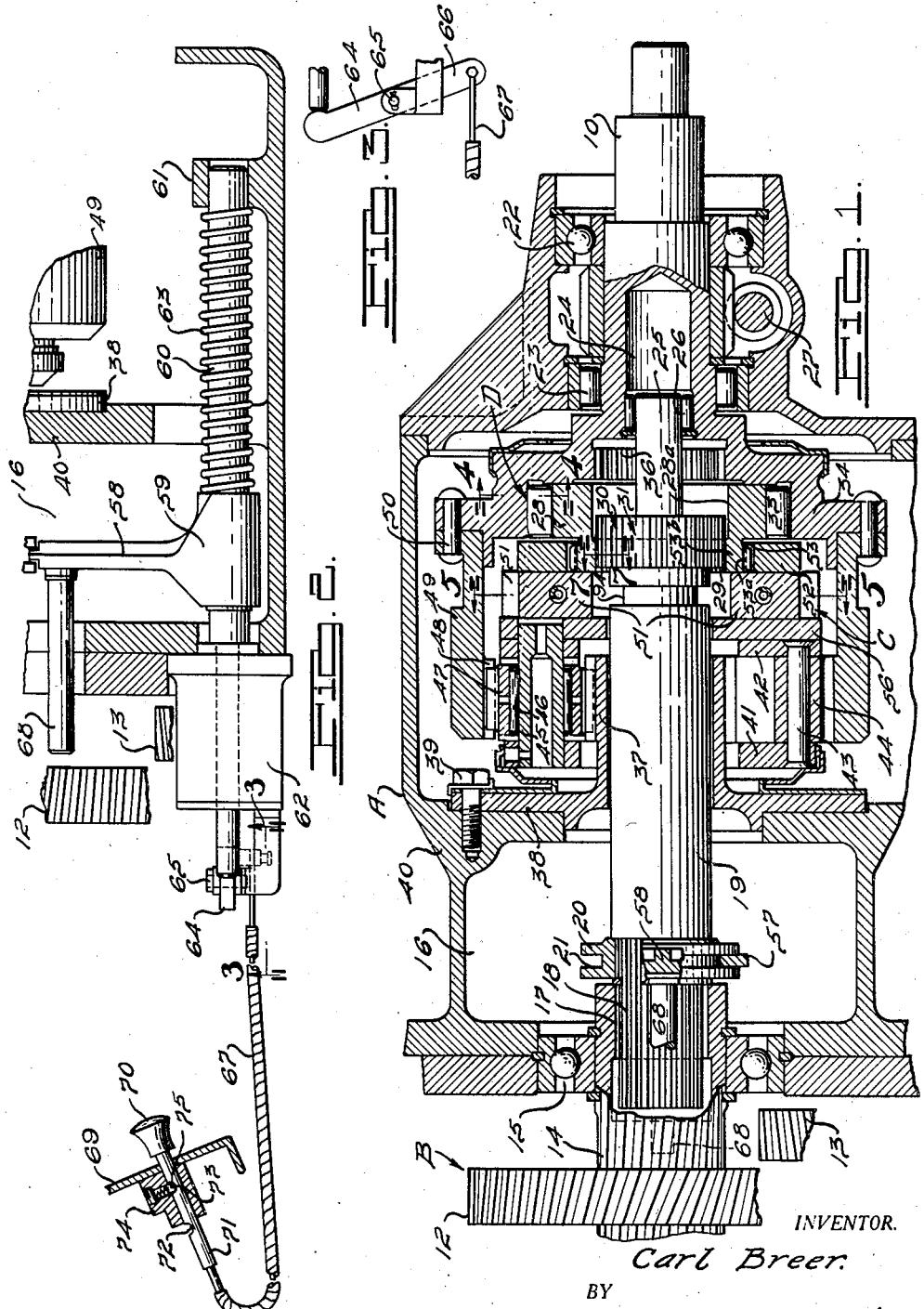

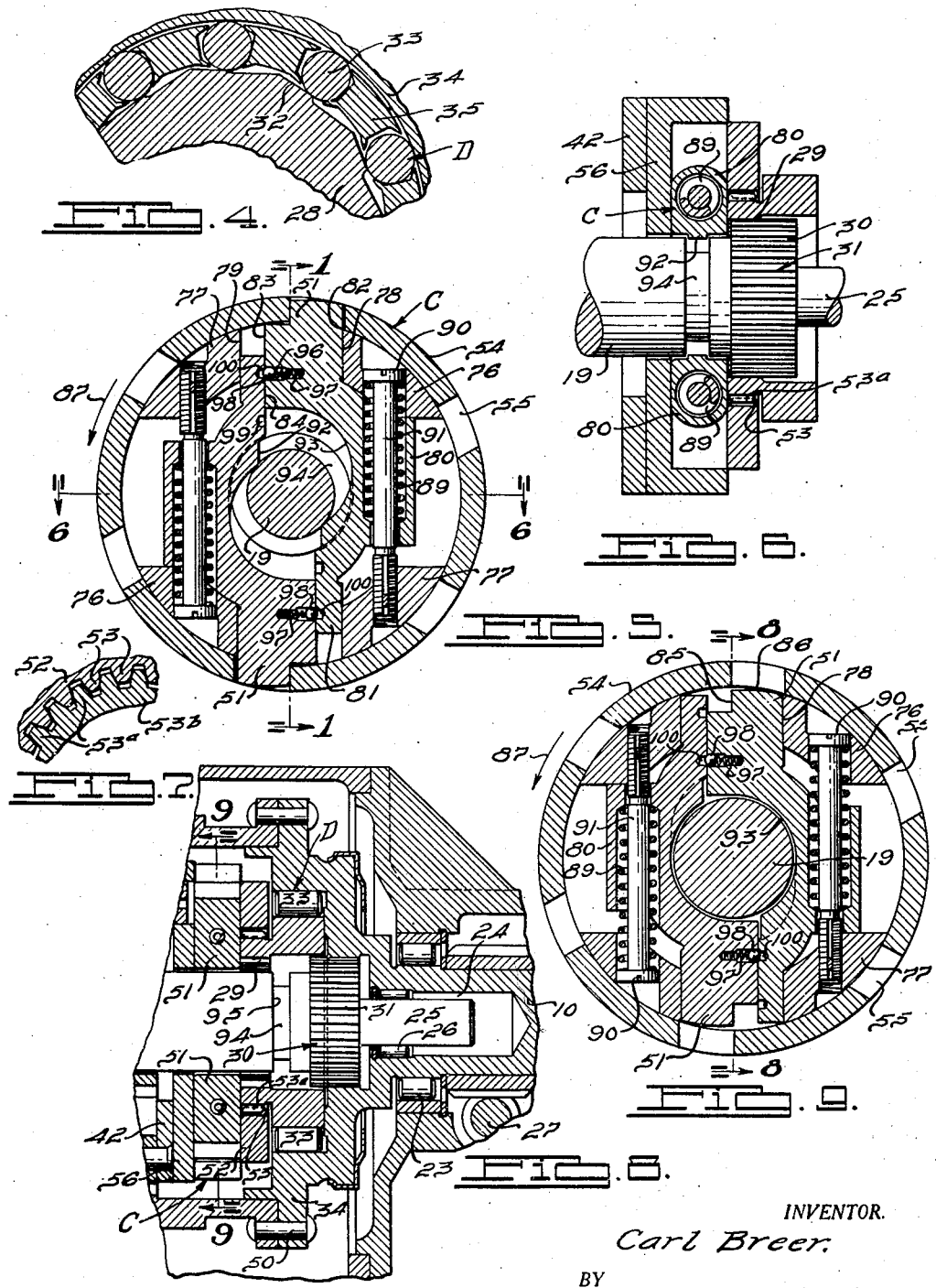

2,139,717

UNITED STATES PATENT OFFICE 2,139,717

POWER TRANSMISSION

Carl Breer, Grosse Pointe Park, Mich., assignor to Chrysler Corporation, Detroit, Mich., a corporation of Delaware Application December 6, 1934, Serial No. 756,207

24 Claims. (Cl. 74—260)

This invention relates to power transmissions especially adapted for use in driving motor vehicles and refers more particularly to improvements in speed ratio changing mechanisms in motor vehicle drives.

In one of its embodiments, my invention provides improvements in automatic change speed devices and while my improvements are readily adaptable to a variety of arrangements of speed ratio gearings and gear train values, I have preferred to illustrate the principles of my invention in connection with an automatically operating overdriving mechanism.

One object of my invention is to provide improved means for controlling the operation of the overdrive gearing control clutch preferably of the automatic centrifugal force operated type whereby the driving mechanism cannot be manually operated for a direct drive between the driving and driven shafts while the drive between said shafts is through the overdrive gearing. Further, my invention preferably also includes, as a further control and protection to the transmission mechanism, means for preventing engaging operation of the centrifugal clutch to establish an overdrive or to tend to establish such drive while the driving mechanism is set for a direct two way drive between said shaft.

A further object of my invention is to provide improved safety controlling means for a transmission mechanism whereby improper or undesired driving conditions cannot occur or tend to take place.

A further object of my invention is to provide improved means for controlling an overrunning clutch between driving and driven shafts preferably in conjunction with a drive of a gear ratio differing from 1 to 1 between said shafts.

Another object of my invention is to provide improvements in shiftable lock-out means for overrunning clutches whereby tendency to jam the parts either during the shift to lock-out or during the shift out of lock-out is eliminated.

Still another object of my invention is to provide improved means for minimizing noise, wear, and undue stresses in the operating parts of a transmission mechanism; also to provide means for compensating for minor errors in the alignment and fit of transmission parts.

Further objects and advantages of my invention will be more apparent hereinafter as the following detailed description of one illustrative embodiment of my invention progresses, reference being had to the accompanying drawings in which:

Fig. 1 is a sectional elevational view through my driving mechanism taken approximately on the line 1—1 of Fig. 5.

Fig. 2 is a fragmentary sectional plan view through a portion of the driving mechanism illustrating the manually controlled mechanism for effecting a lock-out of the overrunning clutch.

Fig. 3 is a detail side elevational view of a part of the Fig. 2 mechanism, the view being taken as generally indicated by the line 3—3 of Fig. 2.

Fig. 4 is a fragmentary sectional view along the line 4—4 of Fig. 1 showing the overrunning clutch.

Fig. 5 is a sectional view along 5—5 of Fig. 1 illustrating the automatic clutch in operative condition.

Fig. 6 is a further sectional view through the automatic clutch taken as indicated by the line 6—6 of Fig. 5.

Fig. 7 is a detail sectional view along 7—7 of Fig. 1 illustrating the self-adjusting driving connection.

Fig. 8 is a sectional view of a portion of the mechanism shown in Fig. 1 and illustrating the parts in another position of manual control, the section being taken along the line of 8—8 of Fig. 9.

Fig. 9 is a sectional view along 9—9 of Fig. 8 and showing the automatic clutch of Fig. 5 but in its operative condition.

In the drawings, I have illustrated my driving mechanism A interposed between a speed ratio changing transmission B and the driven shaft 10, the latter extending rearwardly to drive the rear wheels (not shown) of the motor car or vehicle in the usual well-known manner, it being understood that I have elected to show my invention in association with a motor vehicle drive although my invention in its broader aspects is not necessarily limited thereto. Furthermore, my driving mechanism may be used to advantage at various other points in the line of general power transmission between the vehicle engine and the driven wheels, or between driving and driven means such as shafts of other types of devices.

The transmission B may be of any suitable type such as the conventional selector type operated in the well-known manner through usual selector controls whereby the various adjustments may be made to the transmission in order to provide the speed ratios in the line of drive through the transmission.

Inasmuch as transmission B may for the most part be of general conventional construction and operation, I have shown only a portion of the gearing of this transmission in Figs. 1 and 2 wherein 12 represents the gear adapted to be shifted by the usual reverse selector control (not shown) rearwardly or to the right as viewed in Figs. 1 and 2 for engagement with the usual reverse idler gear 13 in order to effect a reverse drive from the normal direction of drive to the driven shaft 10. Thus, by appropriate actuation of the usual transmission controls, gears 12 and 13 may be engaged so as to reverse the drive, it being understood that other manipulations of the transmission mechanism are adapted to selectively produce other desired speed ratio changes in the normal direction of rotation for driven shaft 10.

The power coming from the usual engine or other prime mover (not shown) which may be located forwardly of transmission B, drives the transmission and the power is taken from this transmission by a power driving means or shaft 14 rotatable in a bearing 15, the shaft having a portion extending rearwardly into the shifting space 16 of the driving mechanism A. This rearwardly extending portion of shaft 14 is provided with a rearwardly opening splined bore 17 adapted to receive the forwardly extending splined end 18 of the shiftable driving shaft 19 which forms a part of the shiftable clutch device referred to in detail hereinafter. Shafts 14 and 19 at all times rotate together by reason of the engaging splines 17 and 18. The driving shaft 19 carries a collar 20 having an annular groove 21, this collar being adapted to axially shift the shaft 19 with respect to the shaft 14 as will be more particularly hereinafter apparent.

The driven shaft 10 extends forwardly in bearings 22, 23 and is provided with a forwardly extending bore 24 slidably piloting the rearwardly extending reduced end 25 of shaft 19, a bearing 26 being provided between the bore 24 and the end portion 25. The usual speedometer take-off drive is illustrated at 27.

My driving mechanism A provides, among other things, an auxiliary driving means or mechanism between the driving and driven shafts 14 and 10 respectively, this driving means being preferably of a construction adapted to provide a speed ratio between these shafts of an over-driving character whereby driven shaft 10 may, under certain conditions hereinafter described, be driven from the driving shaft at a speed greater than a direct drive between these shafts, it being understood that the engine and driving shaft 14 will in such instances be relatively slowed down with respect to their normal speed of actuation for a given speed of vehicle travel. If desired, the mechanism A may be re-arranged to provide an underdrive instead of an overdrive, although I prefer to arrange the gearing for an overdrive of the driven shaft 10.

I preferably incorporate in my driving mechanism as a part of the primary means between driving shafts 14 and 19 and driven shaft 10, an overrunning or free wheeling clutch D best shown in Figs. 1 and 4. This clutch may in itself be of any suitable form, the illustration showing a conventional device in which the inner cam member 28 is driven by internal splines or clutch teeth 29 when engaged by the splines or clutch teeth 30 of a shiftable clutch device 31 formed as a part of the driving shaft 19. The inner cam member 28 has cam faces 32 engaged by cylinders 33 so that by the driving rotation of shaft 19, the high sides of cam faces 32 will wedge the cylinders 33 between cam member 28 and the outer cylindrical driven member 34 of the overrunning clutch to establish a direct drive thereto. The usual spacers 35 maintain the cylinders 33 in spaced position, and since the driven free wheeling part 34 is a forward extension of driven shaft 10 as shown in Fig. 1, it will be apparent that whenever the engine or driving shaft 14 slows down, the vehicle and driven shaft 10 may, by reason of the clutch D overrun the driving shaft, other conditions permitting such action as will be presently apparent.

Intermediate the driven part 34 of the free wheeling clutch D and the bearing 26, the driven shaft 10 or outer portion 34 of clutch D is provided with an annular series of internal splined clutch teeth or jaws 36 complementary to the splines 30 of the shiftable clutch 31, the splines 36 and 30 being adapted to interengage when the shaft 19 is shifted rearwardly as will be presently apparent. The portion of the inner overrunning clutch member 28 is recessed at 28ª to clear the clutch 31 when the latter is shifted from the Fig. 1 to the Fig. 8 position and the teeth 29 and 36 are axially spaced sufficiently so that clutch 31 disengages these teeth during shifting movements thereof.

Referring now to the auxiliary driving gearing, I have illustrated this gearing as a planetary gearing although if desired other forms of gearing may be employed. In the illustrated embodiment and referring particularly to Fig. 1, the planetary gearing comprises a sun gear 37 fixed by a bracket 38 and fasteners 39 to the casing 40 of the overdrive mechanism A, the shaft 19 freely rotating within this sun gear. A planet carrier is provided with axially spaced rings 41, 42 connected at circumferentially spaced intervals by the tie members 43, the planetary carrier rings 41, 42 being maintained in spaced relationship by sleeves 44 respectively carried by the tie members 43. In Fig. 1, I have illustrated one of these tie members 43 and associated sleeve 44.

Spaced circumferentially between the tie members 43 and the planet gear shafts 45 supported by the rings 41, 42 and journaled by a bearing 46 on each of the shafts 45 is a planetary gear pinion 47 meshing with the aforesaid sun gear 37. The planetary gears 47 also mesh with an internal gear 48 carried by a sleeve 49 which projects forwardly from the outer member 34 of the free wheeling clutch D. The sleeve 49 may be formed as a part of the member 34 or may be rigidly connected thereto as by the fasteners 50 illustrated in Fig. 1. The sleeve 49 has its axis concentric with the axis of shaft 19.

My clutch C, best shown in Figs. 5, 6 and 9, preferably of the automatic type, has its centrifugally actuated pawls or dogs 51 carried by a pawl cage 52 which has an annular series of internal involute teeth 53 illustrated in Fig. 7 as being meshed with the involute teeth 53ª of a toothed member 53ᵇ, the latter being driven from the driving shaft preferably by being formed as a part of the overrunning clutch portion 28. The pitch diameter of teeth 53ª is slightly less than the corresponding pitch diameter of teeth 53 to relatively accommodate these toothed members to slight eccentricity whereby the pawl carrying core 52 may adjust itself or find its axis which may not be exactly concentric with the axis of clutch portion 28 and shafts 14 and 19. Further advantages and functions of this part of my mechanism will be hereinafter further referred to.

The companion cooperating clutch member of the automatic clutch C is provided by a cylindrical shell or sleeve 54 having an annular series of spaced pawl receiving slots or openings 55, the shell 54 having an inwardly extending forwardly located plate or flange 56 receiving the rearwardly extending ends of the planetary gear shafts 45 whereby the shell 54 is driven by the planetary gears 47. Further details of the clutch C will be described hereinafter.

The aforesaid annular groove 21 of collar 20 is engaged by a yoke 57, a portion of which is shown in Fig. 1, this yoke extending laterally through an arm 58 as seen in Fig. 2. The arm 58 is provided with a hub 59 fixed to a shiftable rod 60 adapted to reciprocate in guides 61 and 62. The rod 60 receives a spring 63 acting against the guide 61 at one end thereof, the spring 63 yieldingly urging the rod 60 forwardly or to the left as viewed in Fig. 2 by reason of the spring acting against the hub 59. The forward end of rod 60 is engaged by the upper end of a lever arm 64 pivotally mounted at 65 and having a downwardly extending lever arm 66 to which is connected an actuating linkage such as a Bowden wire 67.

The arm 58 has a forwardly projecting rod 68 extending into the path of movement of the gear 12 when the latter is moved rearwardly for engagement with the reverse idler gear 13 as aforesaid. The arrangement is such that when the gear 12 is shifted into engagement with gear 13 for establishing the reverse drive, provided that the mechanism is set to properly effect reverse as will be presently apparent, rod 68 will be engaged toward the latter part of the movement of gear 12 so as to move the rod 68 together with the rod 60 rearwardly or to the right as viewed in Figs. 1 and 2, thereby shifting the collar 20 together with shaft 19 and shiftable clutch 31 rearwardly to disengage teeth 30, 29 and to engage teeth 30, 36 to lock out or render the overrunning clutch D ineffective by providing a two-way drive between shafts 14 and 16. During the aforesaid rearward shifting movement of rod 60, spring 63 will be compressed so that on release or forward movement of the gear 12, the parts will be restored to the positions thereof illustrated in Fig. 1 provided, however, that other controls for the shiftable parts are positioned to accommodate such return movement as will be presently apparent.

In addition to the aforesaid manually operated means for shifting the position of clutch 31 in response to a setting of the reverse gearing of transmission B, I have also provided a further manually controlled means for shifting the clutch 31, at times when permitted by my improved controlling means, independently of the movement thereof under the influence of the reverse setting of the transmission. To this end, the aforesaid Bowden wire 67 as diagrammatically illustrated in Fig. 2 extends for convenient manipulation by the vehicle driver, such position being indicated by the usual dash 69 which mounts a handle or knob 70 connected to the other end of the Bowden wire 67. The handle 70 is adapted for movement by the hand of the vehicle driver, this handle being guided from its position illustrated in Fig. 2 to a position in spaced relationship from dash 69, in which extended position the guide portion 71 of the handle registers a notch 72 thereof with spring pressed ball 73 carried by a guide block 74.

The ball 73 and the notches 72 and 75 engageable therewith cooperate to advise the operator of the proper positioning of handle 70 for effecting the desired movement of the shiftable shaft 19 and clutch 31. In Fig. 2 it will be noted that the ball 73 is illustrated in engagement with the notch 75 and in this position spring 63 is acting to move the clutch 31 forwardly or to the position illustrated in Fig. 1. In this position the teeth 30 of clutch 31 are in engagement with the teeth 29 of the free wheeling cam member 28.

It will be noted that when handle 70 is pulled outwardly from dash 69, lever arm 64 will move rod 60 against the tension of spring 63 so as to shift the clutch 31 to disengage teeth 29 and 30 and to engage teeth 36 and 30, this shifting movement of the clutch 31 under actuation of the handle 70 being independent of a similar clutch shifting movement under the influence of reverse gear 12. It will be apparent that when gear 12 is shifted to engage the reverse gear 13, such movement is effective to shift the clutch 31 rearwardly into engagement with teeth 36 as aforesaid, rod 60 separating from its otherwise normally engaging position against lever arm 64 as illustrated in Fig. 3. When the clutch 31 is shifted rearwardly by engagement of notch 72 with ball 73, the clutch device will be maintained in the aforesaid shifted position until the handle 70 is restored to the position illustrated in Fig. 2 whereupon spring 63 will act to restore the clutch to its position illustrated in Fig. 1.

Referring now to the details of my clutch C which is preferably of the automatic type, one embodiment thereof being illustrated in Figs. 5, 6 and 9, the pawl cage 52 is provided with diametrically arranged pairs of lateral extensions or pawl guides 76 and 77. Extensions 76 have pawl engaging faces 78 and extensions 77 have similar bearing faces 79. Fitting within shell 54 are a pair of the said pawls 51, each having a face in sliding engagement with a face 78 of extension 76 and each extending generally inwardly of the pawl carrying cage. Thus, each pawl is formed with a yoke portion 80 normally seated on an extension 77, each yoke portion having a guide counterbalancing portion 81 slidable intermediate a face 79 and the sides of the other pawl opposite the sides thereof in engagement with the face 78.

The face or side of each pawl 51 which slides against a face 78 has been designated by reference character 82 and this side of the pawl may be referred to as the coast side. The opposite side or face of each pawl 51 is indicated at 83 in sliding contact with the face 84 of the guide portion 81 of the other associated pawl. The drive side or face of each pawl 51 is indicated at 85 and it will be noted that this side 85 is offset from the side 83. Each pawl 51 has an outer cam face 86, it being noted that the drive side is spaced somewhat farther from the inner surface of shell 54 than the spacing of the outer extremity of the coast side 82, when the clutch C is disengaged as shown in Fig. 9, so that the cam face 86 may be said to extend forwardly and radially inwardly of the direction of rotation of the clutch as indicated by the arrow 87 in Fig. 5. It will be noted that with the pawls 51 positioned as illustrated in Fig. 9, the cam face 86 at its highest point at the outer extremity of the coast side 82, has a small clearance with the inner surface of the slot carrying shell 54.

In order to normally urge the pawls 51 inwardly of the pawl cage 52 to position the parts as shown in Fig. 9, primary yielding means such as springs 89 are provided, each spring acting on the the head 90 of a screw bolt 91 threadedly engaging suitable openings in extensions 77, the yoke portions 80 being also provided with suitable openings so as to slidably receive the respective bolts 91 and springs 89 cooperating therewith. Thus, the heads 90 of bolts 91 provide adjustable abutments for the compression of springs 89, these springs respectively acting at their operating ends on the yoke portions 80 of the pawls.

In order to provide a latching or locking action to correlate the manual operation of the shifting clutch 31 with the operation of clutch C, I preferably provide each pawl 51 with a projection or finger 92, adjacent the circular recessed portion 93 of the yoke portion 80 so that when clutch C is disengaged, as in Fig. 9, with the clutch 31 moved to lock out position of Fig. 8, the circular recess 93 of each pawl will fit around shaft 19 and thereby prevent the pawls 51 from moving outwardly. Shaft 19 has an annular groove 94 presenting a shoulder 95 so that when shaft 19 is in the Fig. 1 position, the pawls may move outwardly to engage clutch C, the projections 92 being carried into groove 94. However, with clutch C so engaged, the shaft 19 and clutch 31 cannot be shifted rearwardly because of shoulder 95 engaging the projections 92. Disengagement of clutch C moves projections 92 clear of groove 94, then permitting rearward shifting of clutch 31 by handle 70 or else by operation of the aforesaid reversing mechanism.

The shell 54 has the aforesaid plurality of circumferentially spaced pawl receiving slots or openings 55 suitably spaced so that diametrically arranged pairs of slots will simultaneously register with the pawls 51 to receive said pawls under conditions hereinafter more apparent.

The threaded ends of screw bolts 91 permit adjustment of the springs 89 when the heads 90 of these bolts are registered with one of the slots 55 of shell 54, it being understood that the sleeve 49 and casing 40 may have one or more aligned openings adapted for alignment with one of the slots 55 at the time of registration therewith of a bolt head 90 whereby adjustment of the primary springs 89 may be effected from without the overdrive casing, the aligned openings in the aforesaid sleeve and casing not being illustrated in my drawings.

When pawls 51 move outwardly into slots 55, such movement is limited by engagement of yoke portions 80 with projections 76, the yoke portions sliding on bolts 91.

Each pawl 51 is formed with a pocket 96 opening toward a face 84 of the associated counterbalancing guide portion 81 of the other pawl, each pocket 96 receiving secondary yielding means which may be in the form of a spring 97. Each spring 97 acts on a ball 98 movably housed within opening 96 adjacent the other end thereof. Each face 84 is provided with an inner ball receiving detent 99 and an outer ball receiving detent 100. Where it is desired to provide the outer detent 100 as well as the inner detent 99, these cooperating pairs of detents are spaced apart a distance equal to twice the radial or outward movement of each pawl 51, it being noted that when the pawls move outwardly together, the pawl 51 and associated guide 81 of the other pawl move in opposite directions and to the same extent. The purpose of the detents 99 and 100 is to control the movement of the pawls so that they will quickly move outwardly and inwardly without "hunting" tendency.

In the operation of my improved driving mechanism, let it be presumed that the motor vehicle is being driven by the engine forwardly in direct drive with the clutch device 31 in the Fig. 1 position but at a speed below that necessary for the centrifugal force to overcome the resistance of springs 89 and detents 98. Under such conditions of normal drive, the drive shaft 14 provides a one-way direct drive to driven shaft 10 through the medium of the shaft 19, clutch device 31 and overrunning clutch D. During such drive the pawls 51 will be driven at the speed of drive shaft 14 and the slots 55 will be driven from the driven shaft 10 but at a slower speed by reason of the gear train provided by the planetary gearing 48, 47 and 37.

The pawl springs 89 and detents 98 may be selected and adjusted for any desired speed of automatic engagement by clutch C for the overdrive and for purposes of illustration let it be presumed that this setting is such that the critical speed of engagement of clutch C takes place for approximately 45 miles per hour of vehicle travel. With the pawls driven from the engine, as illustrated, these pawls will be set so that they will be projected at a speed of the drive shaft such that when the engine is momentarily throttled down by a momentary release of the usual accelerator pedal, the speed of the slots 55 will remain approximately the same (assuming the vehicle does not perceptibly slow down during the overrunning action) and if such slot speed corresponded to 45 miles per hour or more of vehicle travel then when the pawls, on slowing down, synchronize in speed with the slots, the pawls will project into the slots to effect a smooth positive engagement of clutch C. As soon as engagement of clutch C takes place the drive from shaft 14 to shaft 10 is through the clutch C and planetary gearing in the opposite direction from that aforesaid to drive shaft 10 at a greater speed relative to driving shaft 14. At such time the overrunning clutch D is rendered automatically inoperative for any drive therethrough as soon as clutch C engages, the overrunning clutch portion 34 rotating faster than the inner cam portion 28.

During the time that the drive shaft 14 is being slowed down as aforesaid to effect engagement of the clutch C at or above the critical speed thereof, the pawls go faster than the slots, the pawl cam faces 86 smoothly letting the pawls pass the slots. The pawls will pass the slots until the speeds of the pawls and slots synchronize at which time the pawls move outwardly to engage the pawl coast faces 82 in the coast sides of the slots. On speeding up the engine, the pawl drive faces 85 then drive the engaged drive sides of the slots for the overdrive condition, the outer detents 100 being then engaged by ball 98.

On deceleration of the vehicle below the critical speed of clutch C as determined by the outer detents 100, the pawls are retracted by springs 89 and the drive then is automatically restored to a one-way drive through clutch D as before.

Whenever clutch device 31 is positioned as in Fig. 1, the automatic overdrive may take place and when clutch C engages, the pawl projections 92 lock the clutch 31 against rearward shifting of the clutch to the lock-out position of clutch D.

At any time that clutch C is disengaged and the driver desires a direct two-way drive without free-wheeling, he may shift clutch 31 into engagement with teeth 36 whereupon the drive shaft will drive the driven shaft directly. In such position pawls 51 cannot move outwardly since the recesses 93 fit around shaft 19 as shown in Fig. 9. Furthermore, at such time, the drive from clutch 31 is preferably released to the pawl cage 52 although in certain instances it may be desirable to continue the drive to the pawl cage in which event my safety means will prevent outward pawl movement and resulting damage to the mechanism.

The clutch 31 may also be shifted to the lock-out position by the manual reversing mechanism including the rearward slidable reverse gear 12 as aforesaid.

When in direct two-way drive, as when clutch 31 is in the Fig. 8 position, the clutch 31 is restored to the Fig. 1 position either by the hand operated member 70 or else by returning the reversing mechanism to direct drive or to neutral.

I will now describe certain of the advantages derived by reason of the recess 28ª of the clutch drive portion 28 in its relationship to the clutch device 31 and clutch teeth 29 and 36. This arrangement of parts facilitates movement of the shift device 31 both into and out of the lock-out position.

Heretofore, it was customary in free wheeling controls, to arrange the shifting teeth to engage the teeth of both the inner and outer overrunning clutch members when in the lock-out position. Such arrangement gives rise to several difficulties which are overcome by my improved arrangement. Thus, the backlash at the teeth of the outer clutch portion was taken up ratchet-like during the drive in the lock-out position by the cam portion of the clutch and the shifter clutch teeth were crowded more and more making release of the shifter clutch very difficult and burdensome. With my arrangement of parts the inner clutch member 28 is released from clutch 31 during and preferably prior to engagement of the lock-out teeth 36 so that the aforesaid crowding action cannot take place. In other words, the shifter 31 and clutch portion 28 may have free relative movement during the drive in the lock-out position.

Furthermore, such prior devices were objectionable in that jamming of the teeth often took place during the shift to lock-out since the free wheeling cam member could not have the desired clockwise rotation relative to the driven member necessary to align the teeth engaged during movement of the shifting clutch. My improved construction and arrangement of parts also avoids such difficulty since the connection to the inner cam member is released prior to engagement of teeth 30 and 36. Relative adjusting rotation may thus take place between the shifter teeth 30 and teeth 36 without interference or restraint by the overrunning clutch parts.

If desired, the pawls 51 may be driven from the driven shaft and the slots driven from the driving shaft as will be readily apparent. One such arrangement is illustrated in my copending application Serial No. 707,100 filed January 18, 1934. Other changes in the illustrated mechanism may also be made as desired without departing from the spirit and scope of my invention as defined by the appended claims.

What I claim is:

1. In a power transmission mechanism, a drive shaft, a driven shaft, means including a shiftable clutch device driven by one of said shafts and adapted to provide a direct drive between said shafts, means including a gear train for driving said driven shaft from said drive shaft at a speed ratio different from said direct drive, said speed ratio driving means including driving and driven members respectively adapted for driving connection with said shafts, said speed ratio driving means further including relatively movable clutching structures adapted when engaged to provide a drive through said gear train, manually operable means for selectively shifting said clutch device into positions providing said direct drive and providing a drive to one of said speed ratio members, and means responsive to engagement of said clutching structures to releasably lock said manually operable means against operation to shift said clutch device into position tending to establish said direct drive.

2. In a power transmission mechanism, a drive shaft, a driven shaft, means including a shiftable clutch device driven by one of said shafts and adapted to provide a direct drive between said shafts, means including a gear train for driving said driven shaft from said drive shaft at a speed ratio different from said direct drive, said speed ratio driving means including driving and driven members respectively adapted for driving connection with said shafts, said speed ratio driving means further including relatively movable clutching structures adapted when engaged to provide a drive through said gear train, manually operable means for selectively shifting said clutch device into positions providing said direct drive and providing a drive to one of said speed ratio members, and means to releasably lock said clutching structures against relative clutching movement while said clutch device is in said position for providing said direct drive.

3. In a power transmission mechanism, a drive shaft, a driven shaft, means including a shiftable clutch device driven by one of said shafts and adapted to provide a direct drive between said shafts, means including a gear train for driving said driven shaft from said drive shaft at a speed ratio different from said direct drive, said speed ratio driving means including driving and driven members respectively adapted for driving connection with said shafts, said speed ratio driving means further including relatively movable clutching structures adapted when engaged to provide a drive through said gear train, manually operable means for selectively shifting said clutch device into positions providing said direct drive and providing a drive to one of said speed ratio members, and means responsive to engagement of said clutching structures to releasably lock said manually operable means against operation to shift said clutch device into position tending to establish said direct drive, said locking means being released in response to disengagement of said clutching structures to permit said manually operable means to shift said clutch device into said direct drive position.

4. In a power transmission mechanism, a drive shaft, a driven shaft, means including a shiftable clutch device driven by one of said shafts and adapted to provide a direct drive between said shafts, means including a gear train for driving said driven shaft from said drive shaft at a speed ratio different from said direct drive, said speed ratio driving means including driving and driven members respectively adapted for driving connection with said shafts, said speed ratio driving means further including relatively movable clutching structures adapted when engaged to provide a drive through said gear train, manually operable means for selectively shifting said clutch device into positions providing said direct drive and providing a drive to one of said speed ratio members, and means responsive to engagement of said clutch members to releasably lock said manually operable means against operation to shift said clutch device into position tending to establish said direct drive, said locking means being released in response to disengagement of said clutching structures to permit said manually operable means to shift said clutch device into said direct drive position, and means cooperating with said locking means to releasably lock said clutching structures against relative clutching movement while said clutch device is in said direct drive position.

5. In a power transmission mechanism, a drive shaft, a driven shaft, means including a shiftable clutch device driven by one of said shafts and adapted to provide a direct drive between said shafts, means including a gear train for driving said driven shaft from said drive shaft at a speed ratio different from said direct drive, said speed ratio driving means including driving and driven members respectively adapted for driving connection with said shafts, said speed ratio driving means further including relatively movable clutching structures adapted when engaged to provide a drive through said gear train, one of said clutching structures being movable in response to centrifugal force acting thereon into clutching engagement with the other of said clutching structures, manually operable means for selectively shifting said clutch device into positions providing said direct drive and providing a drive to one of said speed ratio members, and means responsive to clutching movement of said centrifugal force actuated clutching structure for releasably holding said manually operable means against operation to shift said clutch device into position tending to establish said direct drive.

6. In a power transmission mechanism, a drive shaft, a driven shaft, means including a shiftable clutch device driven by one of said shafts and adapted to provide a direct drive between said shafts, means including a gear train for driving said driven shaft from said drive shaft at a speed ratio different from said direct drive, said speed ratio driving means including driving and driven members respectively adapted for driving connection with said shafts, said speed ratio driving means further including relatively movable clutching structures adapted when engaged to provide a drive through said gear train, one of said clutching structures being movable in response to centrifugal force acting thereon into clutching engagement with the other of said clutching structures, manually operable means for selectively shifting said clutch device into positions providing said direct drive and providing a drive to one of said speed ratio members, said clutch device having a shoulder, and latch means engaging said shoulder in response to clutching movement of said centrifugal force actuated clutching structure for releasably holding said manually operable means against operation to shift said clutch device into position tending to establish said direct drive.

7. In a power transmission mechanism, a drive shaft, a driven shaft, means including a shiftable clutch device driven by one of said shafts and adapted to provide a direct drive between said shafts, means including a gear train for driving said driven shaft from said drive shaft at a speed ratio different from said direct drive, said speed ratio driving means including driving and driven members respectively adapted for driving connection with said shafts, said speed ratio driving means further including relatively movable clutching structures adapted when engaged to provide a drive through said gear train, one of said clutching structures being movable in response to centrifugal force acting thereon into clutching engagement with the other of said clutching structures, manually operable means for selectively shifting said clutch device into positions providing said direct drive and providing a drive to one of said speed ratio members, said clutch device having a shoulder, and latch means carried by said centrifugal force actuated clutching structure and engaging said shoulder in response to clutching movement of said centrifugal force actuated clutching structure for releasably holding said manually operable means against operation to shift said clutch device into position tending to establish said direct drive.

8. In a power transmission mechanism, a drive shaft, a driven shaft, means including a shiftable clutch device driven by one of said shafts and adapted to provide a direct drive between said shafts, means including a gear train for driving said driven shaft from said drive shaft at a speed ratio different from said direct drive, said speed ratio driving means including driving and driven members respectively adapted for driving connection with said shafts, said speed ratio driving means further including relatively movable clutching structures adapted when engaged to provide a drive through said gear train, one of said clutching structures being movable in response to centrifugal force acting thereon into clutching engagement with the other of said clutching structures, manually operable means for selectively shifting said clutch device into positions providing said direct drive and providing a drive to one of said speed ratio members, said clutch device having a shoulder, and latch means comprising a projection movable as a unit with said centrifugal force actuated clutching structure and engaging said shoulder in response to clutching movement of said centrifugal force actuated clutching structure for releasably holding said manually operable means against operation to shift said clutch device into position tending to establish said direct drive.

9. In a power transmission, a drive shaft, a driven shaft, an overrunning clutch including driving and driven members respectively adapted for driving connection to said shafts for transmitting a one way drive therebetween, clutch teeth continuously drivingly connected to each of said members, a manually shiftable clutch device having teeth adapted for selective engagement with the teeth of said overrunning clutch members, and means for driving said clutch device from said driving shaft, said clutch device releasing said engagement with the teeth of said overrunning clutch driving member prior to engagement thereof with the teeth of said overrunning clutch driven member in providing a two way drive between said shafts.

10. In a power transmission, a drive shaft, a driven shaft, an overrunning clutch including driving and driven members respectively adapted for driving connection to said shafts for transmitting a one way drive therebetween, clutch teeth continuously drivingly connected to each of said members, a manually shiftable clutch device having teeth adapted for selective engagement with the teeth of said overrunning clutch members, and means for driving said clutch device from said driving shaft, said clutch device releasing said engagement with the teeth of said overrunning clutch driving member during engagement thereof with the teeth of said overrunning clutch driven member in providing a two way drive between said shafts.

11. In a drive for a motor vehicle having a power driving shaft and a shaft driven therefrom and adapted to drive the vehicle, said driving and driven shafts being in axial alignment, overrunning clutch means intermediate said shafts for transmitting a releasable one-way direct drive therebetween, rotatable clutching structures one having a clutching element adapted to clutch with the other in response to substantially synchronized rotation of said clutching structures at or above a pre-determined speed to provide a releasable positive driving connection therebetween, means for driving one of said structures from said driving shaft, means for driving the other of said structures from said driven shaft, at least one of said driving means including a gear train adapted to drive its associated clutching structure at a speed different from that imparted to the other of said structures when said driving shaft drives said driven shaft through said overrunning clutch, said overrunning clutch being rendered inoperative in response to clutching of said structures, manually controlled clutch means shiftable relative to said clutching structures for locking out said overrunning clutch to provide a direct two-way drive between said driving and driven shafts, and means responsive to clutching of said structures for locking said manually controlled clutch means against operation to provide said direct two-way drive.

12. In a power transmission for a motor vehicle, power driving means including a driving shaft, means including a shaft driven from said driving means and adapted to drive the vehicle, said driving and driven shafts being co-axially arranged for relative rotation, an internal gear rotatable with said driven shaft, a relatively fixed sun gear, a planetary pinion engaging said internal gear and said sun gear, clutching structures adapted when declutched to be driven by said planetary pinion and by said driving means respectively, said clutching structures being adapted when clutched to provide a drive from said driving means to said driven means, an overrunning clutch including driving and driven portions thereof respectively drivingly associated with said driving means and said driven means whereby to transmit a one-way drive therebetween, said driven means overrunning said driving means when said driven means is driven from said driving means through said clutching structures, means for driving one of said clutching structures from said driving shaft and including internal teeth carried by the last said clutching structure and external teeth carried by the driving portion of said overrunning clutch and engaging said internal teeth, the pitch diameter of said external teeth being slightly less than that of said internal teeth whereby upon clutching of said clutching structures said planetary pinion may freely adjust itself between said internal gear and said sun gear for orbital movement about an axis slightly off-center with respect to the axis of said external teeth.

13. In a power transmission for a motor vehicle, power driving means including a driving shaft, means including a shaft driven from said driving means and adapted to drive the vehicle, said driving and driven shafts being co-axially arranged for relative rotation, an internal gear rotatable with said driven shaft, a relatively fixed sun gear, a planetary pinion engaging said internal gear and said sun gear, clutching structures adapted when declutched to be driven by said planetary pinion and by said driving means respectively, said clutching structures being adapted when clutched to provide a drive from said driving means to said driven means, an overrunning clutch including driving and driven portions thereof respectively drivingly associated with said driving means and said driven means whereby to transmit a one-way drive therebetween, said driven means overrunning said driving means when said driven means is driven from said driving means through said clutching structures, means for driving one of said clutching structures from said driving shaft and including an internally toothed element carried by the last said clutching structure and an externally toothed element mounted for rotation about the axis of said driving shaft and engaging said internally toothed element, the pitch diameter of the teeth of said externally toothed element being slightly less than that of said internally toothed element whereby upon clutching of said clutching structures said planetary pinion may freely adjust itself between said internal gear and said sun gear for orbital movement about an axis slightly off-center with respect to the axis of said externally toothed element.

14. In a power transmission having driving and driven shafts, an externally toothed member mounted for rotation with one of said shafts, an internally toothed member having its teeth in rolling engagement with the teeth of said externally toothed member, the pitch diameter of the teeth of said externally toothed member being slightly less than that of said internally toothed member whereby said internally toothed member may freely adjust itself slightly eccentrically relative to said externally toothed member, and means including a gear train for drivingly connecting said internally toothed member to the other of said shafts, said driving connecting means including a clutch comprising clutching elements adapted for engagement and disengagement to control the drive through said gear train, said clutching elements being connected respectively to an element of said gear train and to said internally toothed member, one of said clutching elements being disposed for rotation about the axis of one of said shafts but capable of self-adjusting displacement relative to said axis by reason of said driving connection between said toothed members.

15. In a power transmission having driving and driven shafts, an externally toothed member adapted to be drivingly connected to one of said shafts, an internally toothed member adapted to be drivingly connected to the other of said shafts and having its teeth in rolling engagement with the teeth of said externally toothed member, the pitch diameters of said teeth being slightly different whereby one of said toothed members may move slightly off-axis relative to the other, and means for drivingly connecting said toothed members respectively to said shafts, one of said driving connecting means including a pair of relatively engageable and disengageable clutching elements one of which is disposed for rotation about the axis of one of said shafts but capable of self-adjusting displacement relative to said axis by reason of said relative movement of said toothed members.

16. In a power transmission having driving and driven shafts, an externally toothed member adapted to be drivingly connected to one of said shafts, an internally toothed member adapted to be drivingly connected to the other of said shafts and having its teeth in rolling engagement with the teeth of said externally toothed member, the pitch diameters of said teeth being slightly different whereby one of said toothed members may move slightly off-axis relative to the other, and means for drivingly connecting said toothed members respectively to said shafts, one of said driving connecting means including a planetary gear carrier and a centrifugal clutch drivingly connected thereto and rotatable as a unit therewith about the axis of one of said shafts, said unit having self-adjusting displacement relative to its axis by reason of said relative movement of said toothed members.

17. In a power transmission mechanism, a drive shaft, a driven shaft, clutch means drivingly connected to said shafts for transmitting a direct drive therebetween, means including a gear train for driving said driven shaft from said drive shaft at a speed ratio different from said direct drive, said speed ratio driving means including driving and driven members respectively adapted for driving connection with said shafts, said speed ratio driving means further including relatively movable clutching structures adapted when engaged to provide a drive through said gear train, one of said clutching structures being actuated in response to centrifugal force acting thereon into clutching engagement with the other of said clutching structures in response to substantially synchronized rotation of said clutching structures at or above a predetermined speed, and means providing an operative connection between said direct drive clutch means and said centrifugal force actuated clutching structure adapted to control the operation of the last said clutching structure relative to the operation of said direct drive clutch means.

18. In a power transmission mechanism, a drive shaft, a driven shaft, clutch means drivingly connected to said shafts for transmitting a direct drive therebetween, means including a gear train for driving said driven shaft from said drive shaft at a speed ratio different from said direct drive, said speed ratio driving means including driving and driven members respectively adapted for driving connection with said shafts, said speed ratio driving means further including relatively movable clutching structures adapted when engaged to provide a drive through said gear train, one of said clutching structures being actuated in response to centrifugal force acting thereon into clutching engagement with the other of said clutching structures in response to substantially synchronized rotation of said clutching structures at or above a predetermined speed and when said clutch means is disengaged, and latching means providing a releasable connection between said centrifugal force actuated clutching structure and a part of said direct drive clutch means adapted to control the operation of the last said clutch structure.

19. In a power transmission mechanism, a drive shaft, a driven shaft, clutch means drivingly connected to said shafts for transmitting a direct drive therebetween, means including a gear train for driving said driven shaft from said drive shaft at a speed ratio different from said direct drive, said speed ratio driving means including driving and driven members respectively adapted for driving connection with said shafts, said speed ratio driving means further including relatively movable clutching structures adapted when engaged to provide a drive through said gear train, one of said clutching structures including a rotatable slotted element, the other of said clutching structures including a rotatable element actuated in response to centrifugal force acting thereon into clutching engagement with the slot of the first said rotatable element in response to substantially synchronized rotation of said clutching structures at or above a predetermined speed, said clutching structures being fixed against relative movement in the direction of the axis of rotation thereof for disposing said centrifugal force actuated element and said slot in the same general plane perpendicular to said axis of rotation, and releasable latching means engageable with said centrifugal force actuated element for holding this element against actuation during transmission of said direct drive to said driven shaft when said centrifugal force actuated element is rotated above said predetermined speed.

20. In a power transmission mechanism, a drive shaft, a driven shaft, clutch means drivingly connected to said shafts for transmitting direct drive therebetween, means including a gear train for driving said driven shaft from said drive shaft at a speed ratio different from said direct drive, said speed ratio driving means including driving and driven members respectively adapted for driving connection with said shafts, said speed ratio driving means further including relatively movable clutching structures adapted when engaged to provide a drive through said gear train, one of said clutching structures including a rotatable slotted element, the other of said clutching structures including a rotatable element actuated in response to centrifugal force acting thereon into clutching engagement with the slot of the first said rotatable element in response to substantially synchronized rotation of said clutching structures at or above a predetermined speed and when said clutch means is disengaged, said clutching structures being fixed against relative movement in the direction of the axis of rotation thereof for disposing said centrifugal force actuated element and said slot in the same general plane perpendicular to said axis of rotation, and latch means between said clutch means and said centrifugal force actuated element for holding this element against actuation toward said slot during said direct drive when said centrifugal force actuated element is rotated above said predetermined speed.

21. In a motor vehicle power transmission, coaxial driving and driven shafts, means including a clutch controlled gear train having driving and driven parts respectively adapted for driving connection to said shafts for transmitting an overdrive to said driven shaft, said clutch comprising a centrifugal element and a slotted element adapted for relative rotation by said gear train means, direct driving means between said shafts including a clutch having parts thereof respectively adapted for driving connection to said shafts and constructed and arranged for relative movement to enable reduction in the speed of the drive shaft below that of the driven shaft to synchronize the speeds of said clutch elements, said centrifugal element being engageable with the slot of said slotted element in response to a predetermined rotative speed of said centrifugal element and in further response to synchronization of the speeds of said clutch elements, and control means engageable with said centrifugal element for holding said element against movement toward said slot when said centrifugal element is rotated above said predetermined speed.

22. In a power transmission mechanism, a drive shaft, a driven shaft, means including a shiftable clutch device driven by one of said shafts and adapted to provide a direct drive between said shafts, means including a gear train for driving said driven shaft from said drive shaft at a speed ratio different from said direct drive, said speed ratio driving means including driving and driven members respectively adapted for driving connection with said shafts, said speed ratio driving means further including relatively movable clutching structures adapted when engaged to provide a drive through said gear train, manually operable means for selectively shifting said clutch device into positions providing said direct drive and providing a drive to one of said speed ratio members, and means responsive to engagement of said clutching structures to releasably lock said manually operable means against operation to shift said clutch device into position tending to establish said direct drive, said clutch device including an axially aligned extension of said drive shaft in splined engagement therewith.

23. In a power transmission, a drive shaft, a driven shaft, an overrunning clutch including driving and driven members respectively adapted for driving connection to said shafts for transmitting a one-way drive therebetween, clutch teeth carried by each of said members, a manually shiftable clutch device having teeth adapted for selective engagement with the teeth of said overrunning clutch members, and means for driving said clutch device from said driving shaft, said clutch device releasing said engagement with the teeth of said overrunning clutch driving member prior to engagement thereof with the teeth of said overrunning clutch driven member in providing a two-way drive between said shafts, said clutch device including an axially aligned extension of said drive shaft in splined engagement therewith.

24. In a drive for a motor vehicle having a power driving shaft and a shaft driven therefrom and adapted to drive the vehicle, said driving and driven shafts being in axial alignment, overrunning clutch means intermediate said shafts for transmitting a releasable one-way direct drive therebetween, rotatable clutching structures one having a clutching element adapted to clutch with the other in response to substantially synchronized rotation of said clutching structures at or above a predetermined speed to provide a releasable positive driving connection therebetween, means for driving one of said structures from said driving shaft, means for driving the other of said structures from said driven shaft, at least one of said driving means including a gear train adapted to drive its associated clutching structure at a speed different from that imparted to the other of said structures when said driving shaft drives said driven shaft through said overrunning clutch, said overrunning clutch being rendered inoperative in response to clutching of said structures, manually controlled clutch means for locking out said overrunning clutch to provide a direct two-way drive between said driving and driven shafts, and means responsive to clutching of said structures for locking said manually controlled clutch means against operation to provide said direct two-way drive, said manually controlled clutch means including a shiftable shaft axially aligned with and positioned intermediate said driving and driven shafts.

CARL BREER.